United States Patent
Vance et al.

(10) Patent No.: US 7,596,215 B2
(45) Date of Patent: Sep. 29, 2009

(54) SYSTEM AND METHOD FOR TELECONFERENCE PASS CODE SECURITY AT A TELECOMMUNICATIONS SWITCH

(75) Inventors: Joseph E. Vance, Roseville, MN (US); John M. Verbil, Scottsdale, AZ (US)

(73) Assignee: Qwest Communications International, Inc., Denver, CO (US)

( * ) Notice: Subject to any disclaimer, the term of this patent is extended or adjusted under 35 U.S.C. 154(b) by 1019 days.

(21) Appl. No.: 10/856,129

(22) Filed: May 28, 2004

(65) Prior Publication Data

US 2005/0265537 A1    Dec. 1, 2005

(51) Int. Cl.
*H04M 3/56* (2006.01)
*H04L 12/18* (2006.01)
*H04M 7/00* (2006.01)

(52) U.S. Cl. ............ 379/202.01; 370/260; 370/261; 379/207.02; 379/221.08; 379/221.11

(58) Field of Classification Search ........... 379/202.01, 379/207.02, 203.01–206.01, 221.08–221.12; 370/260, 261
See application file for complete search history.

(56) References Cited

U.S. PATENT DOCUMENTS

| | | | | |
|---|---|---|---|---|
| 4,455,455 A * | 6/1984 | Little | .................... | 379/203.01 |
| 5,483,588 A * | 1/1996 | Eaton et al. | ............ | 379/202.01 |
| 5,526,415 A * | 6/1996 | Wakamoto | .................. | 379/230 |
| 5,802,157 A | 9/1998 | Clarke et al. | | |
| 5,812,652 A * | 9/1998 | Jodoin et al. | ........... | 379/205.01 |
| 5,812,653 A * | 9/1998 | Jodoin et al. | ........... | 379/205.01 |
| 5,844,896 A | 12/1998 | Marks et al. | | |
| 5,995,608 A * | 11/1999 | Detampel et al. | ...... | 379/205.01 |
| 6,301,350 B1 | 10/2001 | Henningson et al. | | |
| 6,310,939 B1 * | 10/2001 | Varney | .................... | 379/88.01 |
| 6,411,605 B1 | 6/2002 | Vance et al. | | |
| 6,430,281 B1 * | 8/2002 | Morley et al. | .......... | 379/210.01 |
| 6,647,106 B1 * | 11/2003 | Hussain et al. | ......... | 379/207.02 |
| 6,754,322 B1 * | 6/2004 | Bushnell | ................ | 379/202.01 |
| 6,801,610 B1 * | 10/2004 | Malik | .................... | 379/202.01 |
| 6,947,537 B2 * | 9/2005 | Pershan | ................. | 379/207.02 |
| 6,980,632 B1 * | 12/2005 | Brown et al. | ........... | 379/114.28 |
| 7,254,383 B2 * | 8/2007 | Novack et al. | ............... | 455/410 |
| 2002/0067812 A1 * | 6/2002 | Fellingham et al. | ...... | 379/93.25 |
| 2002/0118808 A1 * | 8/2002 | Kelleher et al. | ......... | 379/202.01 |
| 2004/0170265 A1 * | 9/2004 | Benco et al. | ........... | 379/202.01 |

* cited by examiner

*Primary Examiner*—Harry S Hong

(57) ABSTRACT

Pass code security is provided for a teleconference call in an AIN-based telecommunications network. Participants to the conference call dial in to a bridge at a Service Switching Point (SSP). If a trigger is detected on the line associated with the bridge, a Service Control Point (SCP) is queried, which in turn causes an Intelligent Peripheral (IP) to generate a voice message asking the caller for a pass code. If a valid pass code is entered by the caller and received at the IP, the SSP connects the caller to the bridge.

13 Claims, 3 Drawing Sheets

SERVICE PROFILE & LINE CONDITON

| | | | |
|---|---|---|---|
| DESTINATION NUMBER | 801-579-5469 | | |
| SCHEDULE - BEGIN-END | 9 AM | 11 AM | 5/5/04 |
| | 1 PM | 2 PM | 5/5/04 |
| | 7PM | 10 PM | 5/5/04 |
| PASS CODE | 1 2 3 4 5 6 7 | | |
| LINE CONDITION | Y/N | | |

FIG. 3

SYSTEM AND METHOD FOR TELECONFERENCE PASS CODE SECURITY AT A TELECOMMUNICATIONS SWITCH

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

Teleconferencing systems enable a plurality of telephone users to participate in a telephone conference call using a telecommunications device referred to as a "bridge". A bridge has a plurality of ports, each for being connected to a telephone line from one of the participants, and enabling that participant to be connected to the call.

Some teleconferencing systems require participants to each have a security number or pass code, so that only those callers authorized to participate are connected to one of the ports. Pass codes are used to prevent unintended callers from dialing in and eavesdropping, and also prevent callers from using the bridge to make unauthorized calls or conduct fraudulent activities. Pass codes are entered by a caller at his/her telephone in response to a prompt from a voice response unit (VRU). The VRU provides one or more voice messages that instruct the caller and lead him or her through the steps of correctly entering digits of the pass code. The VRU then compares the entered pass code to a list of authorized pass codes.

Bridges may be privately operated (e.g., by a large company that has its own telecommunications equipment), or publicly operated by a telephone company as part of the public switched telephone network (PSTN). An example of a teleconferencing system that uses a scheduler for setting up conference calls is disclosed in U.S. Pat. No. 6,411,605, issued to Vance et al., commonly owned with the present application, and hereby incorporated by reference.

The teleconferencing bridge and the associated equipment for operating the bridge can be costly. In order to save some of this cost, some central office switches may have bridges built-in as part of the switch (e.g., the DMS-100 and DMS-250 switches sold by Nortel Networks Corporation, Ontario, Canada.). However to provide security for teleconferencing participants, a VRU and other equipment is needed. Such equipment is placed at the switch (at the lines connecting the bridges to the switching circuitry) so that pass codes may be entered and screened as part of setting up a conference call. However the equipment is costly and can off-set all the savings from having the bridges built into the switch.

BRIEF SUMMARY OF THE INVENTION

There is provided, in accordance with embodiments of the present invention, a network/system and method for providing pass code security to a teleconferencing bridge in an AIN-based telephone network.

In one embodiment, a method and system for establishing a conference call and having pass code security includes an AIN capable switch, an Intelligent Peripheral (IP) for performing voice functions and dialed digit collection, and a Service Control Point (SCP) for accessing subscriber profile information associated with the subscriber line in order to initiate IP functions. The SCP is queried or accessed in response to a detection of a trigger at the switch. The IP provides a voice announcement in response to the access of the SCP, and the switch completes a connection to a teleconferencing bridge if a valid pass code is entered by a caller in response to the voice announcement.

A more complete understanding of the present invention may be derived by referring to the detailed description of the invention and to the claims, when considered in connection with the Figures.

BRIEF DESCRIPTION OF THE DRAWINGS

FIG. 3 illustrates service profile and line condition data accessed at the SCP, and used in one embodiment of the invention.

DETAILED DESCRIPTION OF THE INVENTION

Figure 1:
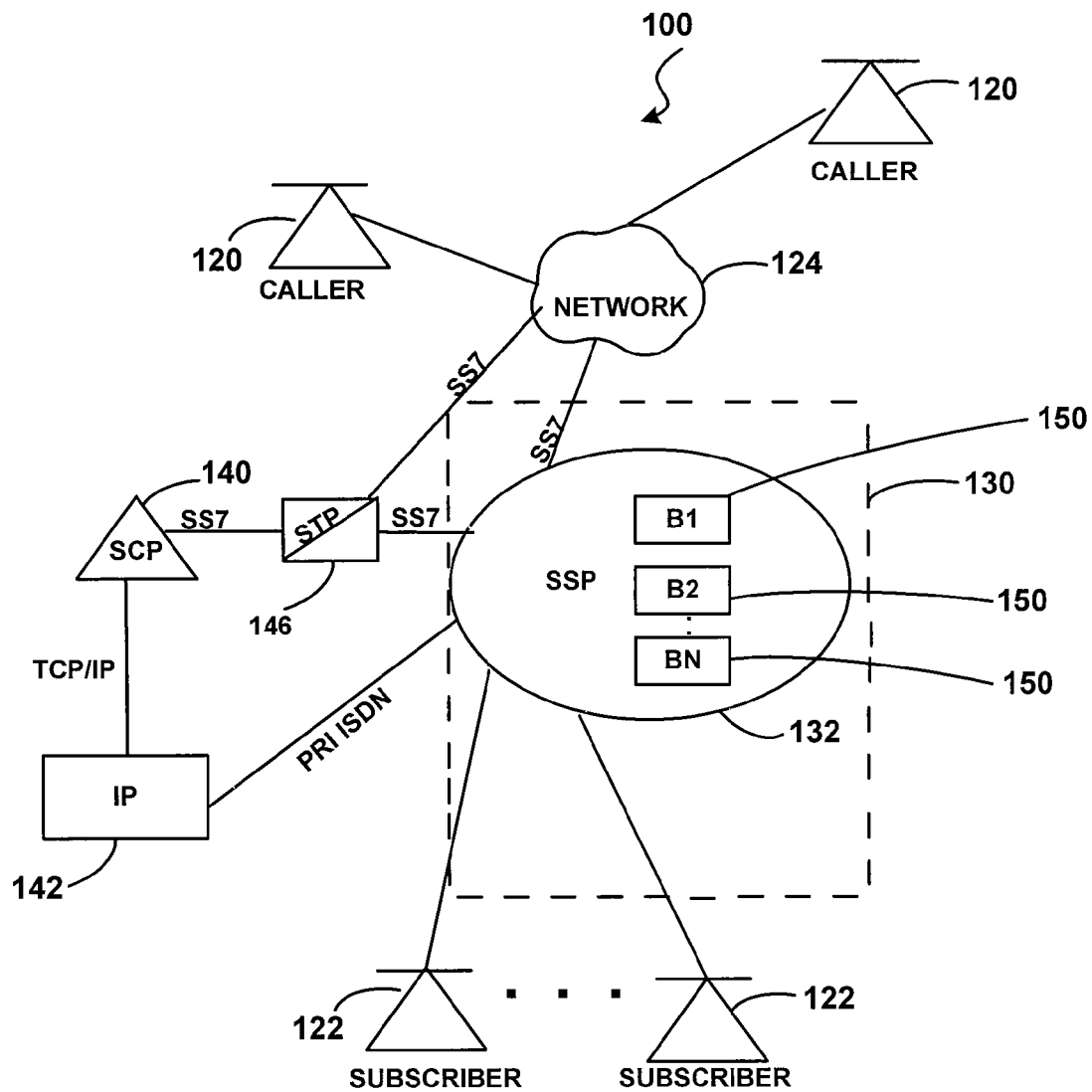
FIG. 1 is a general block diagram illustrating an Advanced Intelligent Network wherein embodiments of the invention may be used.

There are various embodiments and configurations for implementing the present invention. On such implementation is shown in FIG. 1, where an Advanced Intelligent Network (AIN) architecture is shown, and where some embodiments of the invention may be implemented. The AIN architecture is designated generally by reference number 100 and is comprised of well known packet switching elements and transmissions links, some of which are shown.

The operation of a network implementing AIN architecture is understood by those skilled in the art. As an example, when a caller 120 dials the telephone number for one of the subscribers 122 served at a destination central office (CO) 130, the call is carried over the public switched telephone network (PSTN) 124 to a switch, such as that shown as Service Switching Point (SSP) 132.

AIN services are provided through the use of a Service Control Point (SCP) 140 and an Intelligent Peripheral (IP) 142. In some networks, such as those using systems designed by Telecordia Technologies, Inc., they are sometimes referred to as an Intelligent Service Control Point (ISCP) and an Intelligent Services Peripheral (ISP), respectively. As is well known, the SCP includes or is connected to a database (not shown) for storing data and programs pertaining to individual subscriber profiles and services, and the IP 142 provides functionality for performing various telephone services and features, such as voice announcements, voice recognition, and dual-tone multifrequency (DTMF) digit collection and processing.

The SCP 142 is connected to the network 124 (including SSP 132) by a Signal Transfer Point (STP) 146. The STP 146 is a packet switch used to route signaling messages within the network.

The AIN architecture 100 includes common channel signaling (CCS) using signaling system number 7 (SS7) network protocols. As shown in FIG. 1, SS7 network connections may link the SSP 132 to the PSTN 124. SS7 paths also provide a communications link between the SCP 140 and the network 124 (and SSP 132) via the STP 146. The IP 142 may be connected to the SSP by a PRI (primary rate interface) ISDN line and connected to the SCP 140 by a TCP/IP (wide area network) signal path.

The various features, transmission links and AIN services of the type described above, both generally and specifically, are readily available and are described in many publications and patents, including U.S. Pat. No. 5,844,896, issued to Marks et al., U.S. Pat. No. 5,802,157, issued to Clarke et al., and U.S. Pat. No. 6,301,350, issued to Henningson et al. Each of these referenced patents are commonly owned with the present application, and all are hereby incorporated by reference.

FIG. 1 also shows a plurality of bridges 150 (B1 through BN) located within the SSP 132, used for establishing conference calls. The bridges are accessed by callers 120 using a destination telephone number that is assigned to each bridge. Thus by dialing the destination number, each caller 120 is connected to a port at one bridge 150 along with any other caller dialing that same number. In the illustrated embodiment the bridges 150 and their functionality may be included within the functionality (hardware and software) of a central office switch (such as the SSP 132). Such built-in bridges are found in some switches, such as the previously mentioned DMS-100 and the DMS-250 switches from Nortel. However, such bridges do not have an associated VRU required to implement various voice recognition and pass code features, unless the VRU is separately added to the lines connecting the SSP 132 to the bridges.

It should be understood that in other embodiments the bridges need not be part of the SSP 132, but rather any one or all could be separate equipment located elsewhere within the central office and linked to the switch by a telephone line, or could be located away from the central office and linked to the SSP 132 through network 124.

It should be noted that if SSP 132 were implemented using a DBMS-250 (tandem) switch, there would be no subscribers 122 connected to the SSP (since it is a tandem switch).

In accordance with embodiments of the invention, pass code features are provided for use with the bridges 150 by setting a specific digit string trigger (within SSP 132) for each telephone number associated with the bridges. Such a trigger launches a query to SCP 140, which in turn connects the caller to IP 142, requiring the caller to provide a pass code in order to be connected to the conference call at the bridge.

Figure 2:
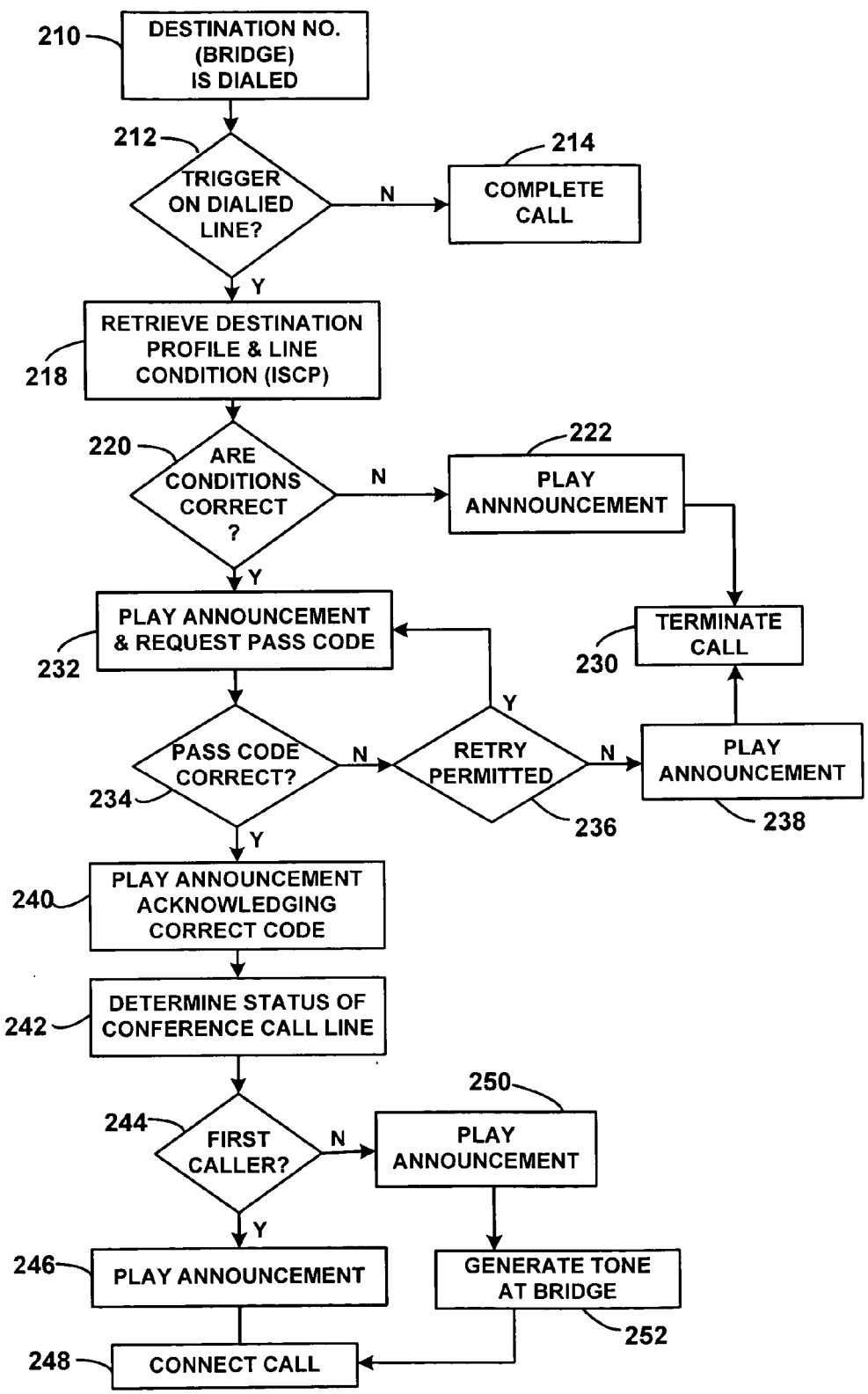
FIG. 2 is a flow diagram illustrating the operation of teleconferencing features in the AIN network of FIG. 1.

FIG. 2 is a flow diagram illustrating the program steps in implementing applications running within the SCP 140 and the IP 142 for providing pass code functionality in accordance with one embodiment of the invention. FIG. 2 is described in conjunction with FIG. 1 and also in conjunction with FIG. 3, which illustrates service profile and line condition data stored at (or accessed by) the SCP 140.

Referring now to FIG. 2, when a conference call is to be made, the telephone number to the bridge is dialed (step 210), and the SSP 132 first determines, at step 212, whether a trigger (in this case, a "specific digit string" trigger) has been set against the line. If such a trigger has been set, the SSP launches a query or call to the SCP 140, which accesses data and executes programs to initiate the pass code and other functions performed as part of setting up the conference call. If there is no trigger, the call is completed to the destination line or phone, step 214. As should be appreciated, a trigger is absent only if there is no AIN implemented service, and thus if the bridge 150 has been set up to take conference calls (with an AIN implemented pass code feature), a trigger will be present.

Referring briefly to FIG. 3, there is shown data (part of the call processing record) accessed at the SCP when there is a trigger. As seen, profile data is stored and related to the destination number (the telephone number associated with the bridge). Such data may include the times and dates for scheduled conference calls, the authorized pass code, and line condition data for the line ("on" if the bridge is already active and "off" if no calls have been made to the bridge). As will be described shortly, the scheduling information is used to determine whether a call is being made at times when a conference call is scheduled, and the line condition data is used to determine whether the conference call is in progress. While shown as data accessed at the SCP, it should be appreciated that some or all of the data could also be accessed at a separate database associated with the IP.

Returning to FIG. 2, the SCP accesses the profile and line condition data (illustrated in FIG. 3) at step 218 and then determines that conditions are correct for the call to take place, at step 220, (i.e., that the bridge has been reserved for a conference call at the time the call is received). The SCP then temporarily connects the call to the IP in order to implement the voice recognition and other pass code features of the invention. If conditions are not correct (i.e., there is no call scheduled), then the IP plays an announcement to that effect at step 222 (e.g., "I'm sorry, no call has been scheduled at this time. Please try your call later"). The IP, in conjunction with the SCP, then sends a command to the switch to terminate the call (step 230).

If conditions are correct, the IP plays a message welcoming the caller and requesting entry of the pass code by the caller, step 232. The IP receives the entered DTMF digits and if the pass code is correct (step 234), the SCP continues with the process for setting-up the call. If the pass code is not correct, the SCP determines how many retries will be permitted (step 236) and repeats the request for entry of the pass code (step 232). As an example, it may be predetermined that the caller will be permitted only three tries to enter the pass code, and if on the third try the pass code is not correct, then the caller will not be permitted to join the conference call. If such is the case, the IP plays an announcement at step 238 (e.g., "I'm sorry you're having trouble. Please try your call later"), and the call is terminated at step 230.

If the caller enters the correct pass code, then the IP plays an announcement acknowledging the correct code (step 240). The SCP then checks the line status (step 242) (line status "on" or "off", as illustrated in FIG. 3). If the call has not previously been set up (the person dialing is the first caller, step 244), then an announcement to that effect is played by the IP (step 246) and the caller is connected to the bridge, step 248. On the other hand, if the caller is not the first call at step 244, then an announcement is played by the IP at step 250 (e.g., "You are joining your call in progress"), and the IP also generates a tone on the line (step 252) to alert existing participants that a caller is joining. The SCP then instructs the switch to connect the new caller to the conference bridge (at step 248).

While not shown in FIG. 2, it should be appreciated that each bridge 150 will have a maximum number of ports (e.g., thirty) to which callers may be connected. If a caller dials in and all ports are occupied (30 previous callers have dialed in and been connected), the SSP 132 may be programmed to generate a busy signal (e.g., 120 impulses or tones per minute) that will be returned to and heard by the caller.

It can be seen from the preceding discussion that the present invention provides a novel method and system for providing pass code functionality to bridges used in a teleconferencing system. In particular, embodiments of the present invention use existing AIN capability to provide the voice response and screening features that would otherwise have to be preformed using a separate voice response unit (VRU). While detailed descriptions of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. In an Advanced Intelligent Network (AIN) having an AIN capable switch, an Intelligent Peripheral (IP) for performing voice functions and dialed digit collection, and a Service Control Point (SCP) for accessing data associated with the subscriber line in order to initiate IP functions, a method for providing pass code security to calls connected to a teleconferencing bridge for enabling a plurality of telephone users to participate in a telephone conference call, wherein the teleconferencing bridge is part of the switch, the method comprising:
    establishing a trigger for a telephone number, to be detected when the teleconferencing bridge is dialed;
    upon detection of the trigger, accessing the SCP;
    providing a voice announcement from the IP in response to the access of the SCP, the voice announcement instructing a caller to enter a pass code; and
    completing the connection to the teleconferencing bridge if a valid pass code is entered.

2. The method of claim 1, wherein the SCP accesses service profile information in order to initiate voice announcements from the IP.

3. The method of claim 2, wherein the trigger is a specific digit string trigger.

4. The method of claim 3, wherein the service profile information includes data on the scheduling of conference calls.

5. The method of claim 4, wherein the SCP further accesses line condition data.

6. The method of claim 5, wherein the line condition data indicates whether the conference call is in progress.

7. The method of claim 1, wherein trigger is detected at the switch.

8. The method of claim 7, wherein the detection of the trigger indicates that an AIN service feature is to be initiated at the SCP prior to completing the call.

9. The method of claim 8, wherein the pass code security is enabled by initiating an AIN service feature, and wherein the AIN service feature is implemented using the SCP and the IP.

10. A teleconferencing system for use in establishing a conference call in a telecommunications network having AIN (Advanced Intelligent Network) architecture, wherein the conference call has pass code security for preventing unauthorized callers from participating in the conference call, the system comprising:
    a teleconferencing bridge for connecting callers to the conference call;
    an SSP (Service Switching Point) for connecting callers to the teleconferencing bridge, wherein the teleconferencing bridge is part of the SSP;
    a trigger for being detected at the SSP;
    an SCP (Service Control Point) for executing a program that accesses profile information in response to the detection of the trigger at the SSP; and
    an IP (Intelligent Peripheral) for executing a program in response to a command from the SCP, the program providing a voice announcement requesting a pass code, and then collecting and verifying the digits of the pass code;
    wherein the switch connects a caller to the teleconferencing bridge in response to the IP verifying the digits of the pass code.

11. The system of claim 10, wherein the SSP, the SCP, and the IP are all located at a telephone central office.

12. The system of claim 11, where the trigger is detected in response to a call to the teleconferencing bridge received at the SSP.

13. A teleconferencing system for establishing a conference call in an telecommunications network having AIN (Advanced Intelligent Network) architecture, comprising:
    teleconferencing bridge means having an associated telephone line number and for connecting callers to the conference call;
    SSP (Service Switching Point) means for connecting callers to the teleconferencing bridge means if a trigger is present at a telephone line number associated with the teleconferencing bridge means, wherein the teleconferencing bridge means is incorporated into the SSP means;
    SCP (Service Control Point) means executing a program for accessing profile information in response to the detection of the trigger at the SSP; and
    IP (Intelligent Peripheral) means executing a program in response to a command from the SCP means, the IP means providing a voice announcement requesting a pass code and collecting and verifying the digits of the pass code from a caller;
    wherein the SSP means connects a caller to the teleconferencing bridge means if the IP means verifies the digits of the pass code.

* * * * *